S. B. GRAY, DEC'D.
B. S. GRAY, EXECUTOR.
MOTOR VEHICLE.
APPLICATION FILED JULY 14, 1906.
923,167.
Patented June 1, 1909.
5 SHEETS—SHEET 1.
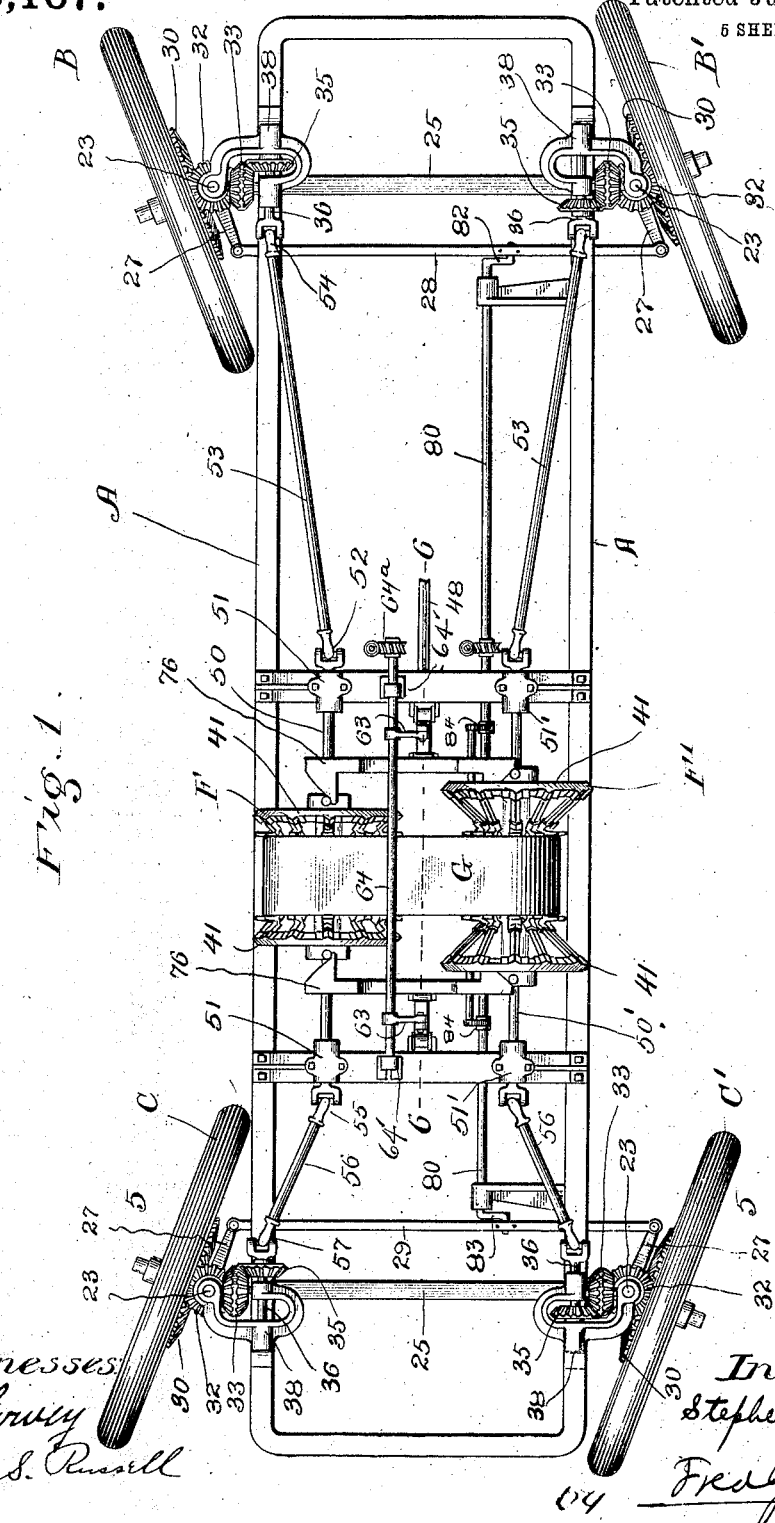
Witnesses
C. P. Thurley
Leone S. Russell
Inventor:
Stephen B. Gray.
Fred Gerlach
Atty

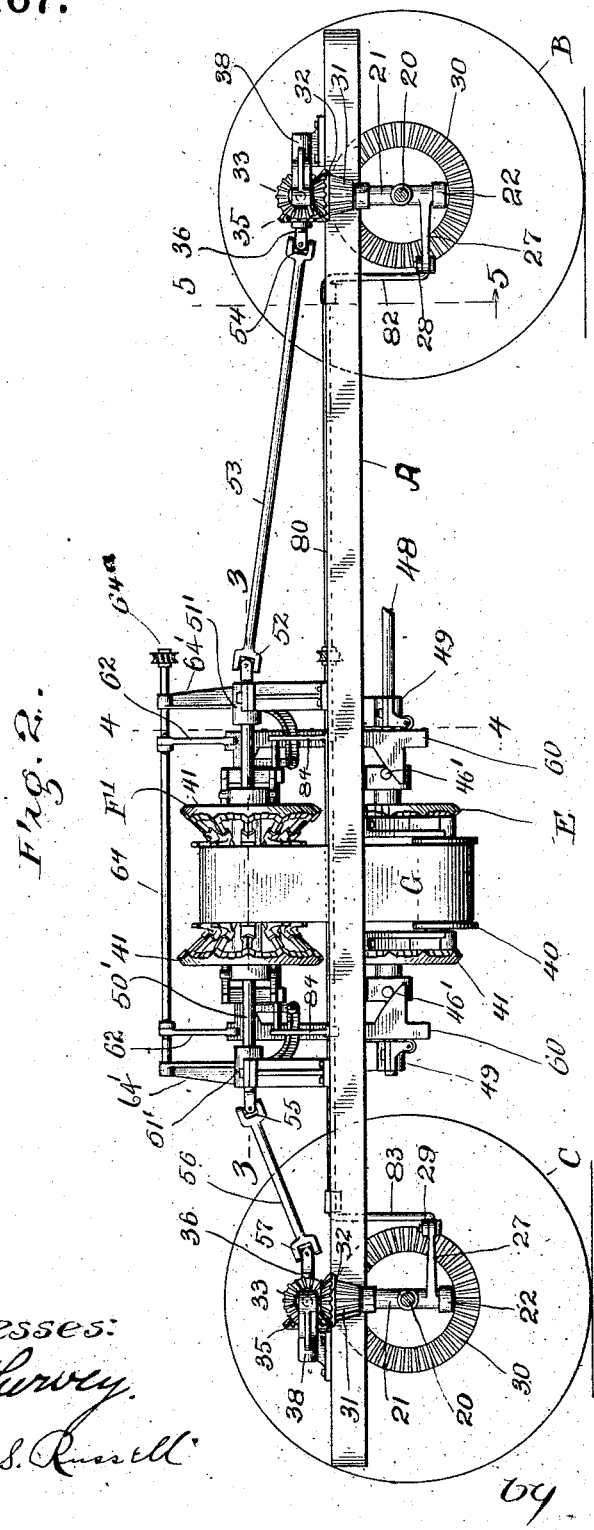

S. B. GRAY, DEC'D.
B. S. GRAY, EXECUTOR.
MOTOR VEHICLE.
APPLICATION FILED JULY 14, 1906.
923,167.
Patented June 1, 1909.
5 SHEETS—SHEET 3.
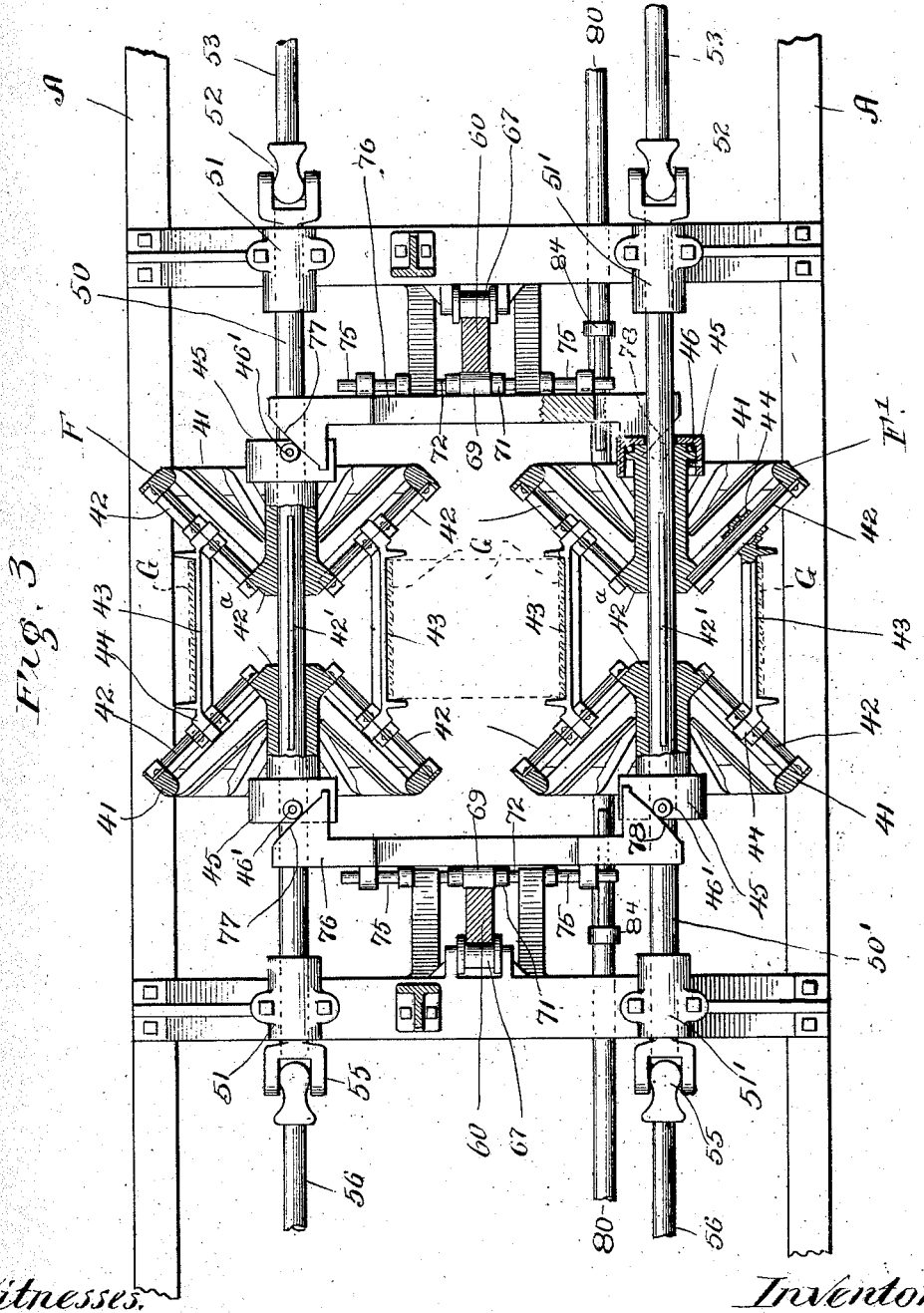
Witnesses.
C. O. Shurvey
Leone S. Russell
Inventor.
Stephen B. Gray.
by Fred Gerlach
atty.

S. B. GRAY, DEC'D.
B. S. GRAY, EXECUTOR.
MOTOR VEHICLE.
APPLICATION FILED JULY 14, 1906.
923,167.
Patented June 1, 1909.
5 SHEETS—SHEET 4.
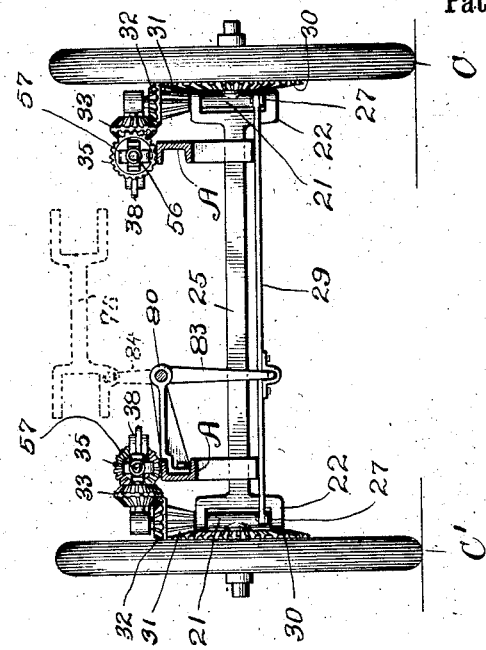
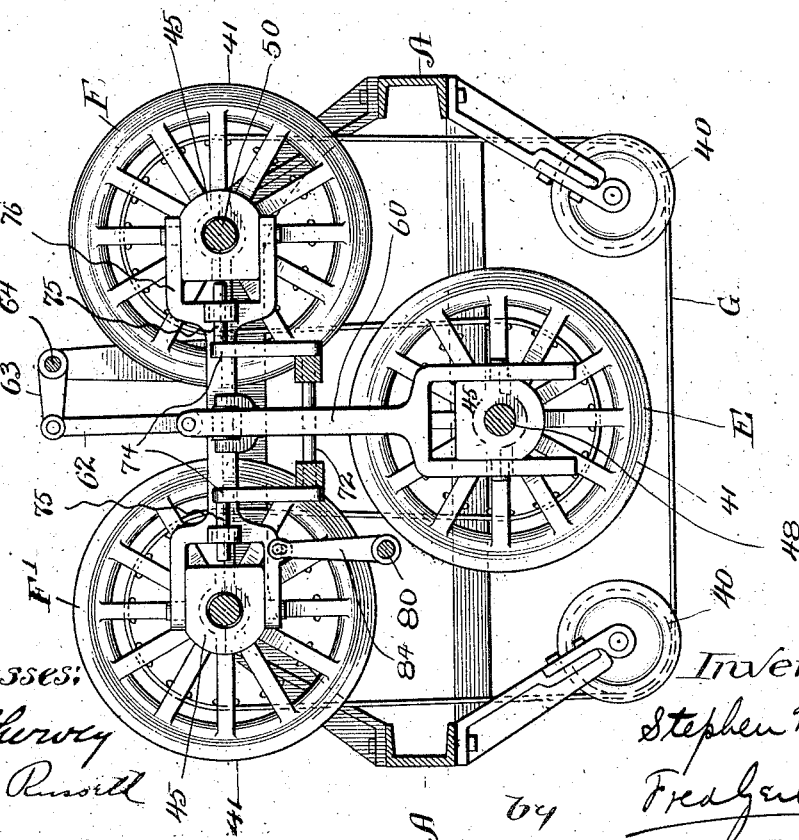
Witnesses:
C. O. Shervey
Leonr Russill
Inventor.
Stephen B. Gray
Fred Gerlach
Atty

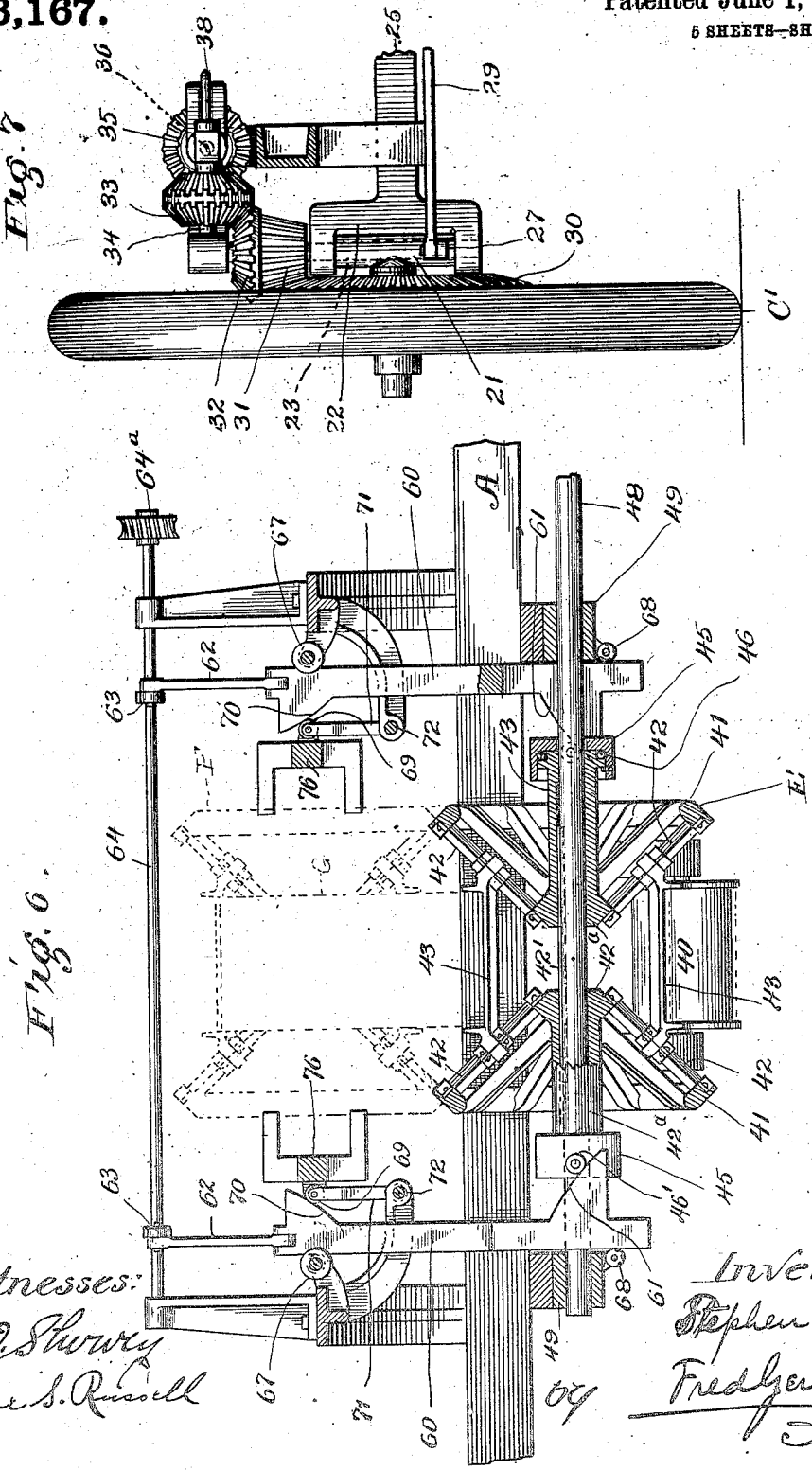

UNITED STATES PATENT OFFICE.

STEPHEN B. GRAY, OF JACKSONVILLE, ILLINOIS; BARTLETT S. GRAY EXECUTOR OF SAID STEPHEN B. GRAY, DECEASED.

MOTOR-VEHICLE.

No. 923,167.        Specification of Letters Patent.        Patented June 1, 1909.

Application filed July 14, 1906. Serial No. 326,187.

*To all whom it may concern:*

Be it known that I, STEPHEN B. GRAY, a resident of Jacksonville, in the county of Morgan and State of Illinois, have invented certain new and useful Improvements in Motor-Vehicles, of which the following is a full, clear and exact description.

The present invention relates to power driven vehicles such as automobiles or traction-engines and more particularly to the driving-mechanism whereby power is transmitted from the motor to the traction-wheels.

It has heretofore been proposed to drive four wheels of the vehicle, *i. e.*, to make all of the wheels traction-wheels and in so doing to employ the well known "differential gears" intermediate the traction wheels to allow the vehicle to be steered. In this differential gear-mechanism it has been found that if there was little or no traction on either of a pair of wheels connected by means of the differential gear, all of the power would pass to the wheel offering the least resistance, and resultantly at times, *e. g.* when on uneven ground one wheel has little or no contact with the ground or in turning a corner, the traction would be reduced and thus when the traction of all wheels is most desired it would be insufficient to propel the vehicle.

One object of the invention is to provide a motor-vehicle embodying front and rear traction-wheels and having mechanism whereby both the front and rear wheels at one side of the vehicle are positively driven at differential speed with respect to both wheels at the other side of the vehicle and to avoid the use of the common "differential gears" which permit the driving-mechanism to slip or adapt itself according to the course traveled by the wheels respectively. In other words, the invention designs to provide driving-mechanism whereby all of the wheels are dirigible and are driven and so all of them will be positively driven at proper relative speed when necessary in steering and so that each of the wheels will be driven independently of one another.

The invention further designs to provide an improved variable speed driving-mechanism for motor vehicles which can be changed at will and in which the speed can be graduated as desired.

The invention consists in the several novel features hereinafter set forth and more particularly defined by the claims at the conclusion hereof.

In the drawings: Figure 1, is a plan view of a frame, the wheels and driving-mechanism of a motor vehicle embodying the invention. Fig. 2 is a side elevation. Fig. 3 is a horizontal section on line 3—3 of Fig. 2. Fig. 4 is a vertical section taken on line 4—4 of Fig. 2. Fig. 5 is a vertical section on line 5—5 of Fig. 1. Fig. 6 is a vertical section on line 6—6 of Fig. 1. Fig. 7 is a detail view partly in elevation and partly in section of the gear mechanism for driving the traction wheels.

A denotes the supporting-frame which may be of any suitable construction, B and B' the front traction-wheels, and C and C' the rear traction-wheels. Each of the traction-wheels is dirigible (see Figs. 1 and 7) and journaled on a spindle or shaft 20 which is provided with a vertically extending hub 21 having a swiveled connection with a yoke 22. A shaft or pin 23 is journaled in the yoke and extends through hub 21 to connect the wheels to the frame in such manner that they can be swung laterally about the swiveled connection to cause the vehicle to travel in the desired direction. Yokes 22 for the front-wheels are secured to an axle 25 and each of the wheel-spindles has connected thereto an arm 27. The arms 27 for the front wheels are cross-connected by a bar 28 and the arms for the rear wheels are connected in like manner by a cross-bar 29.

A driving-connection is provided for each of the dirigible wheels which permits them to be shifted laterally about their swiveled connection with the axles. Each of said driving-connections comprises a gear-wheel 30 secured to the traction-wheel, connected pinions 31 and 32 journaled on shaft 23, a beveled pinion 33 on a short shaft 34 and engaging with pinion 32 and meshing with a gear 35 which is mounted on a shaft 36, which has a suitable connection with the variable driving-mechanism. Shafts 34 and 36 are journaled in a frame 38 secured to the supporting-frame. The upper end of shaft 23 is also mounted in bracket 38 which may be supported from the axle if springs are interposed between the axle and the supporting-frame. This gearing provides a driving connection for the traction-wheel which permits each wheel to be turned about its pivot 23 to drive the vehicle in the desired course. When shaft 36 is driven, motion will be communicated from gear-wheel 35 to gears 33, 32, 31 and to gear-wheel 30 secured to the traction-wheel. The traction-wheel can be turned about its swiveled connection by shifting arm 27 without disconnecting the gears.

Mechanism for respectively driving the wheels at one side at differential speed with respect to those at the other side in turning the vehicle and to drive each of them to correspond to the traction and for conjointly varying the speed of all of the traction-wheels of the vehicle is provided. Said mechanism (see Figs. 1, 2 and 4) comprises an adjustable pulley E and a pair of adjustable pulleys F and F', all of which are operatively connected by a belt G. Belt G extends around the rims of pulley E, F and F', and around a pair of guide or idler-pulleys 40 mounted in brackets 41 secured to the main-frame. The pulleys E, F and F' are conjointly adjustable to drive the connections of the traction-wheels at different and graduated speeds from the primary driving-shaft. Pulleys F and F' can be adjusted to vary their relative speed to drive the traction-wheels at one side of the vehicle at different speed with respect to the traction-wheels at the other side of the vehicle, the wheel F being connected to positively drive the wheels at one side and the adjustable pulley F' being connected to positively drive the traction-wheels at the other side of the vehicle. Resultantly the speed at which the vehicle travels may be varied as desired and the relative speed of the traction-wheels can be varied to positively drive all of them when the vehicle is being turned.

Each of the adjustable pulleys (see Figs. 3 and 6) comprises a pair of sides 41 longitudinally movable with respect to each other on a shaft and having oppositely arranged inclined guide-bars 42 to which rim-sections 43 are slidably connected by boxes 44. By relative longitudinal movement of the pulley-sides the adjustable rim-sections may be shifted radially and positively inwardly or outwardly to vary the diameter of the rim, thus adjusting the size of the pulley. Each pulley-side 41 is provided with a hub 42$^a$ and a collar 45, non-revolubly held to hold the pulley-sides in assigned position longitudinally and against outward movement. A suitable ball-bearing 46 is interposed between the non-revoluble collar 45 and the hub 42$^a$ of each pulley-side. When the collars 45 are adjusted longitudinally by mechanism hereinafter described, the pulley-sides are correspondingly shifted to adjust the rim-sections inwardly and outwardly. Each collar 45 is provided with rollers or studs 46' with which engages a controller for the pulley. Each pulley is connected to its shaft by a key and groove 42' so one will revolve with the other.

The main driving pulley E is mounted on a main-driving-shaft 48 and is connected thereto by a key or groove 42' so as to be driven thereby. This shaft is journaled in bearings 49 secured to frame-bars A and may be connected to the motor in any suitable or usual manner. Pulley F is mounted on and operatively connected by key and groove 42' to a shaft 50 which is usually provided with a reversing gear and clutch (not shown) driven by the motor. Shaft 50 is mounted in bearings 51 secured to the vehicle-frame. The front end of shaft 50 is connected by universal joints 52 and 54 and shaft 53 to the driving-connection for the front traction wheel B, and the rear end of said shaft is connected by a universal joint 55, universal joint 57 and shaft 56 to the shaft 36 of the driving-connection for the rear-traction wheel C. Thus the shaft, driven by the pulley F is connected to the front and rear traction-wheels at one side of the vehicle. Pulley F' is mounted on a shaft 50', which is mounted in bearings 51' secured to the main frame in any suitable manner and its front and rear ends respectively are connected to the front and rear driving-connections of the traction-wheels B' and C' by similar shaft and universal joint connections. This pulley F' is operatively connected to and positively drives the front and rear traction-wheels at the other side of the machine.

In turning a corner or controlling the course of the vehicle, the inner wheels travel over an arc of shorter radius than traveled by the outer wheels and must therefore be driven at a lower relative speed. Resultantly, the relative speeds of pulleys F and F' must be varied to positively drive the wheels at each side of the vehicle. On varying the speed of the vehicle the relative speed of pulleys F and F' is maintained but their speed with respect to the main driving pulley E is varied. In steering the vehicle, the relative speed of the pulleys F and F' is varied to drive the traction-wheels according to the course in which the vehicle is traveling. The size of the drive-pulley E is controlled by a pair of vertically slidable shifters 60, each of the lower ends of which is provided with a cam-surface 61 adapted to engage the rollers 46' of the adjusting-collars 45 at the opposite sides of pulley E. The upper ends of shifter 60 are each connected by a link 62 to an arm 63, secured to a rock-shaft 64, which may be operated by screw and worm-wheel 64$^a$ to which a hand-wheel (not shown) on the vehicle is connected, or in any other suitable manner. Said rock-shaft is supported from the frame by brackets 64'. By this controlling mechanism the size of the pulley E can be adjusted to drive the vehicle at any desired speed within the limits of the adjustment of the pulley.

The pulleys F and F' driven by the belt G are conjointly adjusted when pulley E is shifted, i. e., when the size of the pulley E is increased the size of pulleys F and F' are correspondingly decreased to retain the belt in operative connection with all of the pulleys. Each of the shifters 60 is guided vertically by rollers 67 and 68 and the upper end of each shifter is provided with a cam-surface 70 which engages a stud or roller 69 on an arm 71 which is secured to a rock-shaft 72, journaled in bearings sustained by the frame. Each rock-shaft 72 has rigidly secured thereto a pair of arms 74, the upper ends of which are pivotally connected by a stud and slot 75 to a slidable and laterally movable shifter 76. Each shifter 76 is provided at one of its ends with a cam-surface 77 in engagement with one of the adjusting collars 45 of pulley F and at its other end with cam-surfaces 78 in engagement with the adjusting collar 45 of the pulley F'. Cams 77 and 78 when moved inwardly or outwardly simultaneously adjust the pulleys F and F' simultaneously with the adjustment of pulley E and so that when the size of the pulley E is varied the size of both pulleys F and F' will be proportionately varied so the belt will be retained in operation with respect to the pulleys and without variation of the relative speed of pulleys F, F'. To vary the speed of the vehicle, shifter 60 will be operated longitudinally by controller-shaft 64, arms 63 and links 62 to shift the adjusting-collars 45 of the pulley E and simultaneously cams 70 of shifter 60 will operate rollers 69, arms 71, rock-shafts 72, arms 74, stud and slot-connections 75, shifters 76, to conjointly shift the adjusting collars 45 of pulleys F, F' inwardly or outwardly to correspondingly vary the size of the pulleys F and F' with respect to pulley E.

The relative speed of pulleys F and F' is controlled by the steering mechanism and is variable to correspond to the direction in which the wheels travel; the degree of variation corresponding to the angle at which the traction-wheels are turned. A steering-shaft 80 is provided at its end with an arm 82 for shifting the cross-bar 28 for the front traction-wheels and its rear end with a similar crank 83 connected to and for shifting the cross-bar 29 for the rear traction wheels. The steering-connections are arranged to swing the wheels about their swivel-connections in opposite directions a like distance to facilitate the turning of the vehicle as indicated in Fig. 1. Steering-shaft 80 may be operated by a lever or screw and gear as well understood in the art, and is provided with arms 84 (see Figs. 1, 4 and 5) the upper ends of which are each connected to one of the shifters 76. Said shifters are shifted bodily inwardly and outwardly by the speed controlling mechanism as hereinbefore described, and are also slidable longitudinally, the stud and slot-connections 75 being formed to permit independent longitudinal movement of these shifters. When the steering-shaft 80 is operated arms 84 will cause the shifters 76 to be moved longitudinally and simultaneously so the cams at one end thereof will shift the adjusting collars 45 of one of the pulleys F, F' inwardly while the cams at the other end of the shifters will be adjusted to allow the belt to adjust the other of said pulleys. When the steering-shaft is operated to turn the steering-wheels, shifters 76 will be simultaneously adjusted to vary the relative size of pulleys F and F' and shaft 50 which drives the traction-wheels at one side of the vehicle will be driven at a different speed than the shaft 50' which drives the traction-wheels at the other side of the vehicle this differentiation varying in degree to correspond to the difference between the curvilinear paths of the wheels and the angles at which the traction-wheels are running. Thus the traction-wheels are positively driven at different relative speeds according to the direction in which the vehicle is traveling and without any slipping of the wheels over the ground in turning.

The operation of the improved mechanism will be as follows: Assuming the driving mechanism to be in the position shown in Fig. 2, and shaft 48 to be driven by the motor, all of the traction-wheels will be driven by power communicated from shaft 48 to pulley E and from said pulley by belt G to pulleys F and F' which will be in position to drive shafts 50 and 51 at the same relative speed, which will, by means of shafts 53 and 56 and the driving-connections at each of the wheels, cause all of the traction-wheels to be driven at the same speed. If the operator desires to decrease or increase the speed of the vehicle he will operate shaft 64 accordingly and thereby arms 63 will operate shifters 60 so the cams 61 will adjust the adjusting-collars 45 of pulley E. Cams 70 of shifters 60 will simultaneously operate arms 71, rock-shafts 73, arms 74 and connections 75 to operate the shifters 76 and 76' which control the adjustment of pulleys F and F'. Said pulleys will be adjusted equidistantly and conjointly to such extent that the belt will be retained in operative relation with all of the pulleys, i. e., if the size of the pulley E is increased the size of pulley F and the size of pulley F' will be decreased and vice versa. Therefore, by operation of shaft 64, the driving-mechanism can be gradually adjusted to drive the vehicle at any desired speed. To steer the vehicle the operator operates shaft 80 which controls cranks 82 and 83 which control the position of the traction-wheels. The front and rear traction-wheels are shifted thereby in opposite directions respectively to facilitate the turning of the vehicle, the wheels of the front being shifted in substantially parallel direction and the rear pair likewise. The shift of the front and rear wheels is such as to cause the rear wheels to travel over the same path as the front wheels. The operation of the controlling mechanism for steering the traction-wheels also effects adjustment of the driving mechanism to differentially drive the traction-wheels at one side with respect to those on the other side to correspond to the curved paths in which they travel respectively. This adjustment is effected by arms 84 which operate the shifters 76 longitudinally so the cams at the ends of said shifters will increase the size of one of the pulleys F, F' and correspondingly decrease the size of the other pulley. Thus each traction-wheel is positively driven at the proper relative speed to cause the vehicle to travel in the course desired and according to the direction of the traction-wheels determined by the steering-mechanism.

The invention possesses some important advantages. It provides a motor-vehicle in which the wheels at one side are positively driven at different relative speed with respect to those at the other side, corresponding to the traction of the wheels. In other words, there is no slip-connection between the driving-wheels at one side of the vehicle and those at the other, or between the front and rear wheels. It also provides an improved driving mechanism whereby the speed of the vehicle can be gradually changed at will and provides a driving mechanism whereby all of the traction wheels can be driven and whereby the speed can be varied.

In some light vehicles it may not be desirable to drive all of the wheels. The improved driving mechanism can be readily applied to a vehicle of this character by omitting the driving connections between shafts 50 and 50', and either the rear or front wheels.

The invention is not to be understood as restricted to the construction shown and described since these may be varied without departing from the spirit and scope of the invention.

Having thus described the invention, what I claim as new and desire to secure by Letters Patent, is:

1. In a motor vehicle, the combination of a pair of front and a pair of rear traction wheels each of said wheels having a dirigible connection to the vehicle, driving connections for all of said wheels, and mechanism for driving the connections for the wheels at one side of the vehicle at different relative speed with respect to the driving connections for the wheels at the other side of the vehicle independently of the tractional engagement of the wheels with the ground.

2. In a motor vehicle, the combination of a pair of front and a pair of rear traction wheels each of said wheels having a dirigible connection to the vehicle, a driving connection for both of the wheels at one side of the vehicle, a driving connection for both the wheels at the other side of the vehicle, and mechanism for driving said connections at different relative speeds to vary the relative speed of the traction wheels independently of the tractional engagement of the wheels with the ground.

3. In a motor vehicle, the combination of a pair of front and a pair of rear traction wheels each of said wheels having a dirigible connection to the vehicle, a driving connection for both of the wheels at one side of the vehicle, a driving connection for both the wheels at the other side of the vehicle, and variable speed mechanism for positively driving said connections at different relative speeds to vary the relative speed of the wheels at one side of the vehicle with respect to the others independently of the tractional engagement of the wheels with the ground.

4. In a motor vehicle, the combination of a pair of front and a pair of rear traction wheels each of said wheels having a dirigible connection to the vehicle, a driving connection for both of the wheels at one side of the vehicle, a driving connection for both the wheels at the other side of the vehicle, and a variable speed mechanism for positively driving said connections at different relative speeds to vary the relative speed of the wheels at one side with respect to those at the other or for driving all of the wheels at the same speed independently of the tractional engagement of the wheels with the ground.

5. In a motor-vehicle, the combination of a pair of front and a pair of rear traction-wheels, each having a dirigible connection to the vehicle, driving-connections for all of said wheels, adjustable mechanism for driving said connections, and means for adjusting said mechanism to drive the connections for the wheels at one side of the vehicle at different speed with respect to the wheels at the other side of the vehicle independently of the tractional engagement of the wheels with the ground.

6. In a motor-vehicle, the combination of a pair of front and a pair of rear traction-wheels, each having a dirigible connection to the vehicle, driving-connections for all of said wheels, a variable speed mechanism for positively driving all of said connections, and means for adjusting the variable speed mechanism to drive the wheels at one side of the vehicle at different relative speed with respect to the wheels at the other side independently of the tractional engagement of the wheels with the ground.

7. In a motor-vehicle, the combination of a pair of front and a pair of rear traction-wheels each having a variable connection to the vehicle, a driving-connection for both of the wheels at one side of the vehicle, a driving-connection for both of the wheels at the other side of the vehicle, a variable speed-mechanism for positively driving both of said connections, and means for adjusting said driving mechanism for driving said connections at different relative speeds to vary the relative speed of the wheels at one side of the vehicle with respect to the others independently of the tractional engagement of the wheels with the ground.

8. In a motor vehicle, the combination of a pair of front and a pair of rear traction wheels each of said wheels having a dirigible connection to the vehicle driving connections for each of said wheels, a shaft operatively connected to the driving connections for the wheels at one side of the vehicle, another shaft operatively connected to the driving connections for the wheels at the other side of the vehicle, and mechanism for driving said shafts at different relative speeds independently of the tractional engagement of the wheels with the ground.

9. In a motor vehicle, the combination of a pair of front and a pair of rear traction wheels, each of said wheels having a dirigible connection to the vehicle driving connections for each of said wheels, a shaft operatively connected to the driving connections for the wheels at one side of the vehicle, another shaft operatively connected to the driving connections for the wheels at the other side of the vehicle, and mechanism for driving said shafts at the same or different relative speeds independently of the tractional engagement of the wheels with the ground.

10. In a motor vehicle, the combination of a pair of front and a pair of rear traction wheels each of said wheels having a dirigible connection to the vehicle, driving connections for each of said wheels, a shaft operatively connected to the driving connections for the wheels at one side of the vehicle, another shaft operatively connected to the driving connections for the wheels at the other side of the vehicle, and mechanism for conjointly varying the speeds of both of said shafts and for driving the shafts at different relative speeds independently of the tractional engagement of the wheels with the ground.

11. In a motor-vehicle, the combination of a pair of front and a pair of rear traction-wheels, each having a dirigible connection to the vehicle, driving-connections for all of said wheels, adjustable mechanism for driving said connections, means for adjusting said mechanism to drive the connections for the wheels at one side of the vehicle at different speed with respect to the wheels at the other side of the vehicle independently of the tractional engagement of the wheels with the ground, and a steering-device connected to all of said wheels and to said adjusting-mechanism to operate it conjointly with the steering-device.

12. In a motor vehicle, the combination of a pair of front and a pair of rear dirigible traction-wheels, a driving-connection for each of said wheels, a steering-device, mechanism for driving said connections, and means for varying the relative speed of the driving connections for the wheels at one side of the vehicle with respect to the wheels at the other side when the steering device is operated.

13. In a motor vehicle, the combination of a pair of front and a pair of rear dirigible traction-wheels, a driving connection for each of said wheels, a steering-device, variable speed mechanism for driving said connections, and means for varying the relative speed of the driving connections for the wheels at one side of the vehicle with respect to the wheels at the other side when the steering device is operated.

14. In a motor vehicle, the combination of a pair of front and a pair of rear dirigible traction-wheels, each having a separate swivel connection with the vehicle, a driving connection for each of said wheels, driving mechanism for said connections, a steering device for simultaneously shifting all of said wheels about their swivel connections, means for varying the driving connections of the wheels at one side of the vehicle with respect to those at the other, and means for operating said varying means when the steering device is operated.

15. In a motor vehicle, the combination of a pair of front and a pair of rear dirigible traction-wheels, each having a separate swivel connection with the vehicle, a driving connection for each of said wheels, a variable speed driving mechanism for said connections, a steering device for simultaneously shifting all of said wheels about their swivel connections, means for varying the driving connections of the wheels at one side of the vehicle with respect to those at the other, and means for operating said varying means when the steering device is operated.

16. In a motor vehicle, the combination of a pair of front and a pair of rear dirigible traction-wheels, a driving connection for each of said wheels, driving mechanism for said connections comprising a pair of adjustable pulleys each respectively connected to drive the traction wheels at one side of the vehicle, and means for varying the relative size of said pulleys to drive the wheels at one side at differential speed with respect to the wheels at the other side.

17. In a motor vehicle, the combination of a pair of front and a pair of rear dirigible traction-wheels, a driving connection for each of said wheels, variable speed driving mechanism for said connections comprising a pair of adjustable pulleys each respectively connected to drive the traction-wheels at one side of the vehicle, and means for varying the relative size of said pulleys to drive the wheels at one side at differential speed with respect to the wheels at the other side.

18. In a motor vehicle, the combination of a pair of front and a pair of rear dirigible traction-wheels, a driving connection for each of said wheels, driving mechanism for said connections comprising a pair of adjustable pulleys each respectively connected to drive the traction-wheels at one side of the vehicle, means for varying the relative size of said pulleys to drive the wheels at one side at differential speed with respect to the wheels at the other side, and means for conjointly adjusting said pulleys without varying their relative size.

19. In a motor vehicle, the combination of a pair of front and a pair of rear dirigible traction-wheels, a driving connection for each of said wheels, driving mechanism for said connections comprising a pair of adjustable pulleys each respectively connected to drive the traction-wheels at one side of the vehicle, a belt connecting said pulleys and means for varying the relative size of the pulleys to drive the wheels at one side of the vehicle at different speed with respect to those at the other.

20. In a motor vehicle, the combination of a pair of front and a pair of rear dirigible traction-wheels, a driving connection for each of said wheels, a variable speed driving mechanism for said connections comprising a pair of adjustable pulleys each respectively connected to drive the traction-wheels at one side of the vehicle, a belt connecting said pulleys and means for varying the relative size of the pulleys to drive the wheels at one side of the vehicle at different speed with respect to those at the other.

21. In a motor vehicle, the combination of a pair of front and a pair of rear dirigible traction-wheels, a driving connection for each of said wheels, driving mechanism for said connections comprising a main drive pulley, a pair of adjustable pulleys each connected to the driving connections for the wheels at one side of the vehicle, a belt connecting all of said pulleys, and means for varying the relative size of said pair of pulleys to drive the wheels at one side at a different speed with respect to those at the other.

22. In a motor vehicle, the combination of a pair of front and a pair of rear dirigible traction wheels, a driving connection for each of said wheels, driving mechanism, a main adjustable pulley, a pair of adjustable pulleys each connected to the driving connections at one side of the vehicle respectively, a belt connecting all of said pulleys, means for adjusting all of said pulleys conjointly, and means for varying the relative size of said pair of pulleys.

23. In a motor vehicle, the combination of a pair of traction wheels, a driving connection for each of said wheels, and mechanism for driving said connections comprising a pair of pulleys having an adjustable rim, a belt connecting the pulleys, and means for conjointly adjusting the rims of said pulleys.

24. In a motor vehicle, the combination of a pair of dirigible traction-wheels, a driving connection for each of said wheels and driving mechanism comprising a pair of adjustable pulleys each having adjustable rims, a belt connecting the pulleys, and means for conjointly adjusting the rims of said pulleys to vary the relative speed of the driving connections.

25. In a motor vehicle, the combination of a pair of dirigible traction wheels a driving connection for each of said wheels, driving mechanism for said connections comprising a pair of pulleys each having adjustable rims, a belt connecting the pulleys, means for conjointly adjusting the rims of the pulleys to vary the relative speed and means for conjointly adjusting the pulleys to maintain the same relative speed.

26. In a motor vehicle, the combination of a pair of dirigible traction wheels, a driving connection for each of said wheels, driving mechanism comprising a pair of pulleys each having adjustable rims, a belt connecting the pulleys, shifting mechanism for correspondingly adjusting said pulleys and shifting mechanism whereby the pulleys may be adjusted to vary their relative sizes.

27. In a motor vehicle, the combination of traction-wheels, driving connections for said wheels and driving mechanism for said connections comprising a pair of pulleys having adjustable rims, and a belt connecting the pulleys, and means for adjusting the pulleys to vary the speed of the driving connections.

28. In a motor vehicle, the combination of traction-wheels, driving connections for the wheels, driving mechanism for said connections comprising a pair of pulleys each comprising adjustable sides and rim sections, a belt connecting the pulleys and means for adjusting the pulley sides to vary the speed of the driving connections.

29. In a motor vehicle, the combination of traction wheels, driving connections for said wheels, driving mechanism comprising a main adjustable driving pulley, a pair of adjustable pulleys and a belt connecting the pulleys, and means for conjointly adjusting all of said pulleys to vary the speed of the driving connections.

30. In a motor vehicle, the combination of traction-wheels, driving connections for said wheels, driving mechanism comprising a main adjustable driving pulley, a pair of adjustable pulleys and a belt connecting the pulleys, means for conjointly adjusting all of said pulleys to vary the speed of the driving connections, and means for relatively adjusting the said pair to vary the relative speed of the driving connections.

STEPHEN B. GRAY.

Witnesses:
 CHAS. O. SHERVEY,
 LESUR S. RUSSELL.